(12) United States Patent
Gadkaree et al.

(10) Patent No.: US 9,607,775 B2
(45) Date of Patent: Mar. 28, 2017

(54) HIGH-VOLTAGE AND HIGH-CAPACITANCE ACTIVATED CARBON AND CARBON-BASED ELECTRODES

(71) Applicant: Corning Incorporated, Corning, NY (US)

(72) Inventors: Kishor Purushottam Gadkaree, Painted Post, NY (US); Jia Liu, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 321 days.

(21) Appl. No.: 14/161,163

(22) Filed: Jan. 22, 2014

(65) Prior Publication Data

US 2015/0062778 A1 Mar. 5, 2015

Related U.S. Application Data

(60) Provisional application No. 61/877,341, filed on Sep. 13, 2013, provisional application No. 61/872,202, filed on Aug. 30, 2013.

(51) Int. Cl.
*H01G 11/26* (2013.01)
*H01G 11/86* (2013.01)
(Continued)

(52) U.S. Cl.
CPC ............. *H01G 11/26* (2013.01); *H01G 11/24* (2013.01); *H01G 11/32* (2013.01); *H01G 11/34* (2013.01);
(Continued)

(58) Field of Classification Search
CPC ......... H01G 11/26; H01G 11/86; H01G 11/42
See application file for complete search history.

(56) References Cited

U.S. PATENT DOCUMENTS 5,958,214 A * 9/1999 Nikolskaja ......... G01N 27/4074
204/294
6,064,562 A * 5/2000 Okamura ............... H01G 9/155
361/502
(Continued)

FOREIGN PATENT DOCUMENTS

JP        2007119538 A  *  5/2007
WO        0239468           5/2002
(Continued)

OTHER PUBLICATIONS

PCT/US2014/053032 Search Report, mailed Nov. 27, 2014.

*Primary Examiner* — Nathan Milakovich
(74) *Attorney, Agent, or Firm* — John L. Haack

(57) ABSTRACT

A positive electrode for an energy storage device includes a first activated carbon material comprising pores having a size of ≤1 nm, which provide a combined pore volume of >0.3 cm$^3$/g, pores having a size of >1 nm to ≤2 nm, which provide a combined pore volume of ≥0.05 cm$^3$/g, and <0.15 cm$^3$/g combined pore volume of any pores having a size of >2 nm. A negative electrode for the energy storage device includes a second activated carbon material comprising pores having a size of ≤1 nm, which provide a combined pore volume of ≤0.3 cm$^3$/g, pores having a size of >1 nm to ≤2 nm, which provide a combined pore volume of ≥0.05 cm$^3$/g, and <0.15 cm$^3$/g combined pore volume of any pores having a size of >2 nm. The total oxygen content in at least the first activated carbon material is at most 1.5 wt. %.

24 Claims, 3 Drawing Sheets

(51) Int. Cl.
*H01G 11/42* (2013.01)
*H01G 11/24* (2013.01)
*H01G 11/32* (2013.01)
*H01G 11/34* (2013.01)
*C01B 31/02* (2006.01)
*H01M 4/133* (2010.01)

(52) U.S. Cl.
CPC ............ *H01G 11/42* (2013.01); *H01G 11/86* (2013.01); *C01B 31/0206* (2013.01); *H01M 4/133* (2013.01); *Y02E 60/13* (2013.01); *Y02T 10/7022* (2013.01); *Y10T 29/417* (2015.01)

(56) References Cited

U.S. PATENT DOCUMENTS

| | | | | |
|---|---|---|---|---|
| 6,631,073 | B1* | 10/2003 | Sakata | H01G 11/34 361/303 |
| 7,317,607 | B2* | 1/2008 | Omura | H01G 9/06 361/502 |
| 8,049,105 | B2* | 11/2011 | Kuroda | H01G 9/2031 136/256 |
| 8,329,341 | B2* | 12/2012 | Gadkaree | C01B 31/083 429/231.7 |
| 8,405,955 | B2 | 3/2013 | Gadkaree et al. | 361/502 |
| 8,524,632 | B2 | 9/2013 | Gadkaree et al. | 502/432 |
| 8,541,338 | B2 | 9/2013 | Gadkaree et al. | 502/424 |
| 8,564,934 | B2 | 10/2013 | Gadkaree et al. | 361/502 |
| 9,136,064 | B2* | 9/2015 | Gadkaree | H01G 11/34 |
| 2002/0097549 | A1* | 7/2002 | Maletin | H01M 4/583 361/502 |
| 2008/0180881 | A1* | 7/2008 | Feaver | H01G 11/34 361/502 |
| 2009/0080142 | A1* | 3/2009 | Nanba | C01B 31/12 361/502 |
| 2011/0228447 | A1* | 9/2011 | Gadkaree | H01G 11/34 361/502 |
| 2011/0294661 | A1* | 12/2011 | Gadkaree | C01B 31/083 502/416 |
| 2012/0008253 | A1* | 1/2012 | Kuroda | H01G 9/2031 361/502 |
| 2012/0177923 | A1 | 7/2012 | Kumara | |
| 2012/0270102 | A1* | 10/2012 | Whitacre | H01G 11/24 429/205 |
| 2015/0030527 | A1* | 1/2015 | Gadkaree | H01G 11/34 423/460 |
| 2015/0116905 | A1* | 4/2015 | Gadkaree | H01G 11/34 361/502 |
| 2015/0240088 | A1* | 8/2015 | Asay | C09D 7/1291 428/220 |
| 2015/0291432 | A1* | 10/2015 | Beguin | B01J 20/20 361/502 |

FOREIGN PATENT DOCUMENTS

WO 2008-053919 5/2008
WO 2011091092 7/2011

* cited by examiner

HIGH-VOLTAGE AND HIGH-CAPACITANCE ACTIVATED CARBON AND CARBON-BASED ELECTRODES

CROSS-REFERENCE TO RELATED APPLICATIONS

This application claims the benefit of priority under 35 U.S.C. §119 of U.S. Application Ser. No. 61/877,341 filed on Sep. 13, 2013, and U.S. Application Ser. No. 61/872,202 filed on Aug. 30, 2013, the entire contents of which are hereby incorporated by reference.

BACKGROUND

Field

The present disclosure relates generally carbon-based electrodes for energy storage devices, and more specifically to carbon-based electrodes exhibiting high-voltage stability and their methods of production.

Technical Background

Energy storage devices such as ultracapacitors may be used in a variety of applications such as where a discrete power pulse is required. Example applications range from cell phones to hybrid vehicles. Ultracapacitors such as electrochemical double layer capacitors (EDLCs) have emerged as an alternative or compliment to batteries in applications that require high power, long shelf life, and/or long cycle life. Ultracapacitors typically comprise a porous separator and an organic electrolyte sandwiched between a pair of carbon-based electrodes. The energy storage is achieved by separating and storing electrical charge in the electrochemical double layers that are created at the interfaces between the electrodes and the electrolyte. Important characteristics of these devices are the energy density and power density that they can provide, which are both largely determined by the properties of the carbon that is incorporated into the electrodes.

BRIEF SUMMARY

In accordance with embodiments of the present disclosure, energy storage devices such as EDLCs include carbon-based electrodes having high voltage stability.

Activated carbon materials typically comprise heteroatoms (e.g., oxygen, nitrogen, hydrogen) and associated functional groups on their surface, which may undesirably participate in Faradaic reactions under an applied voltage and/or at an elevated temperature. Such reactions can degrade the performance of a device comprising the activated carbon. Example functional groups that may be found on the surface of activated carbon are shown in FIG. 1.

Insomuch as higher energy densities and higher power densities may be pursued in next generation EDLCs via operation at high applied voltages, it will be desirable to minimize the number of heteroatoms and functional groups on the activated carbon so as to minimize unwanted Faradaic reactions involving these species, particularly at the higher potentials. Such devices may be achieved in accordance with various embodiments by engineering the pore size distribution and oxygen content of the activated carbon used to form the electrodes.

An energy storage device according to one embodiment comprises a positive electrode and a negative electrode. The positive electrode comprises a first activated carbon material and the negative electrode comprises a second activated carbon material. The first activated carbon material comprises pores having a size of $\leq 1$ nm, which provide a combined pore volume of $>0.3$ cm$^3$/g, pores having a size from $>1$ nm to $\leq 2$ nm, which provide a combined pore volume of $\geq 0.05$ cm$^3$/g, and $<0.15$ cm$^3$/g combined pore volume of any pores having a size of $>2$ nm, while the second activated carbon material comprises pores having a size of $\leq 1$ nm, which provide a combined pore volume of $\leq 0.3$ cm$^3$/g, pores having a size from $>1$ nm to $\leq 2$ nm, which provide a combined pore volume of $\geq 0.05$ cm$^3$/g, and $<0.15$ cm$^3$/g combined pore volume of any pores having a size of $>2$ nm. At least the first activated carbon material, and in embodiments each of the first activated carbon material and the second activated carbon material, includes at most 1.5 wt. % oxygen.

A method of making an energy storage device comprises forming a positive carbon-based electrode having such a first activated carbon material, forming a negative carbon-based electrode having such a second activated carbon material, and incorporating the positive and negative carbon-based electrodes into an energy storage device.

A carbon-based electrode for an energy storage device (e.g., a positive or negative electrode) comprises conductive carbon, a binder and an activated carbon material having a total oxygen content of at most 1.5 wt. %.

Additional features and advantages of the subject matter of the present disclosure will be set forth in the detailed description which follows, and in part will be readily apparent to those skilled in the art from that description or recognized by practicing the subject matter of the present disclosure as described herein, including the detailed description which follows, the claims, as well as the appended drawings.

It is to be understood that both the foregoing general description and the following detailed description present embodiments of the subject matter of the present disclosure, and are intended to provide an overview or framework for understanding the nature and character of the subject matter of the present disclosure as it is claimed. The accompanying drawings are included to provide a further understanding of the subject matter of the present disclosure, and are incorporated into and constitute a part of this specification. The drawings illustrate various embodiments of the subject matter of the present disclosure and together with the description serve to explain the principles and operations of the subject matter of the present disclosure. Additionally, the drawings and descriptions are meant to be merely illustrative, and are not intended to limit the scope of the claims in any manner.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
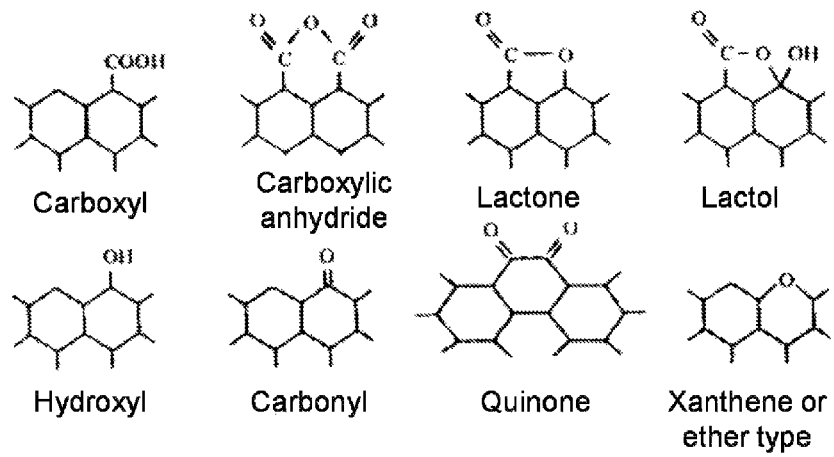
FIG. 1 is a schematic diagram of example oxygen-containing functional groups associated with activated carbon.

Reference will now be made in greater detail to various embodiments of the subject matter of the present disclosure, some embodiments of which are illustrated in the accompanying drawings. The same reference numerals will be used throughout the drawings to refer to the same or similar parts.

Carbon-based electrodes suitable for incorporation into energy storage devices are known. Activated carbon is widely used as a porous material in ultracapacitors due to its large surface area, electronic conductivity, ionic capacitance, chemical stability, and/or low cost. Activated carbon can be made from synthetic precursor materials such as phenolic resins, or natural precursor materials such as coals or biomass. With both synthetic and natural precursors, the activated carbon can be formed by first carbonizing the precursor and then activating the intermediate product. The activation can comprise physical (e.g., steam) or chemical (e.g., KOH) activation at elevated temperatures to increase the porosity and hence the surface area of the carbon. The carbon-based electrodes can include, in addition to activated carbon, a conductive carbon such as carbon black, and a binder such as polytetrafluoroethylene (PTFE) or polyvinylidene fluoride (PVDF). The activated carbon-containing layer (carbon mat) is typically laminated over a current collector to form the carbon-based electrode.

The choice of electrode materials directly affects the performance of the device, including the achievable energy density and power density. The energy density (E) of an EDLC is given by $E=\frac{1}{2} CV^2$, and the power density (P) of an EDCL is given by $P=V^2/R$, where C is the capacitance, V is the device's operating voltage, and R is the equivalent series resistance (ESR) of the device.

Recently, with a goal of increasing the energy density and power density of EDLC devices, engineered carbon materials have been developed to achieve higher capacitance. To achieve higher capacitance, activated carbon materials with high surface area (500-2500 $m^2/g$) may ay be used.

A further approach to increasing the energy density and power density is to increase the capacitor's operating voltage. In this regard, aqueous electrolytes have been used in EDLCs for lower voltage (<1V) operation, while organic electrolytes have been used for higher voltage (2.3-2.7 V) devices. However, to achieve even higher energy densities, there is a need to increase the voltage envelop from conventional values of about 2.7 V to around 3.0 V. Such an increase from 2.7 to 3.0 V will result in a 23% increase in the energy density.

Disclosed is an energy storage device such as an electrochemical double layer capacitor (EDLC) having high voltage stability, high specific capacitance and high energy density. An ultracapacitor, also known as a double-layer capacitor, polarizes an electrolytic solution to store energy electrostatically. Though it is an electrochemical device, no chemical reactions are involved in the energy storage mechanism. The mechanism is reversible, which allows the ultracapacitor to be charged and discharged many times.

Ultracapacitors (EDLCs) typically comprise two porous electrodes that are isolated from electrical contact with each other by a porous dielectric separator. The separator and the electrodes are impregnated with an electrolytic solution, which allows ionic current to flow between the electrodes while preventing electronic current from discharging the cell. Each electrode is typically in electrical contact with a current collector. The current collector, which can comprise a sheet or plate of electrically-conductive material (e.g., aluminum) can reduce ohmic losses while providing physical support for the porous electrode material.

Within an individual ultracapacitor cell, and under the influence of an applied electric potential, an ionic current flows due to the attraction of anions in the electrolyte to the positive electrode and cations to the negative electrode. Ionic charge can accumulate at each of the electrode surfaces to create charge layers at the solid-liquid interfaces. The accumulated charge is held at the respective interfaces by opposite charges in the solid electrodes to generate an electrode potential. Generally, the potential increases as a linear function of the quantity of charged species (ions and radicals) stored at or on the electrode.

During discharge of the cell, a potential across the electrodes causes ionic current to flow as anions are discharged from the surface of the positive electrode and cations are discharged from the surface of the negative electrode. Simultaneously, an electronic current can flow through an external circuit located between the current collectors. The external circuit can be used to power electrical devices.

The performance of electric double layer capacitors (EDLCs) comprising carbon-based electrodes can be intimately related to the properties of the carbon. Specifically, the total available porosity and pore size distribution can impact EDLC performance. In this regard, it has been commonly thought that significant quantities of mesopores are needed for electrolyte ion access to the interior surfaces of the carbon material. In this disclosure, it is demonstrated that EDLCs comprising activated carbon that is tailored to the size of the respective positive and negative ions in the electrolyte exhibit a high specific capacitance (or energy density) and superior resistance to capacitive aging than EDLCs using homogeneous (i.e., symmetric) carbon-based electrodes. This advantage is attributable to the limited oxygen content and customized pore size distribution of the carbon materials.

According to various embodiments, an energy storage device comprises a positive electrode comprising a first activated carbon material and a negative electrode comprising a second activated carbon material. The first activated carbon material comprises pores having a size of ≤1 nm, which provide a combined pore volume of >0.3 $cm^3/g$, pores having a size of >1 nm to ≤2 nm, which provide a combined pore volume of ≥0.05 $cm^3/g$, and <0.15 $cm^3/g$ combined pore volume of any pores having a size of >2 nm. The second activated carbon material comprises pores having a size of ≤1 nm, which provide a combined pore volume of ≤0.3 $cm^3/g$, pores having a size of >1 nm to ≤2 nm, which provide a combined pore volume of ≥0.05 $cm^3/g$, and <0.15 $cm^3/g$ combined pore volume of any pores having a size of >2 nm. In embodiments, the first activated carbon material includes at most 1.5 wt. % oxygen, e.g., at most 1 or 0.5 wt. % oxygen. In related embodiments, each of the first activated carbon material and the second activated carbon material includes at most 1.5 wt. % oxygen, e.g., at most 1 or 0.5 wt. % oxygen. For instance, the activated carbon can have an oxygen content of from 1000 ppm to 1.5 wt. %, e.g., 1000, 2000, 5000, 10000 or 15000 ppm, including ranges between any of the foregoing values.

In embodiments, the activated carbon can be characterized by a high surface area. A carbon-based electrode for an EDLC can include carbon having a specific surface area greater than about 300 $m^2/g$, i.e., greater than 300, 350, 400, 500 or 1000 $m^2/g$. Further, the activated carbon can have a specific surface area less than 2500 m²/g, i.e., less than 2500, 2000, 1500, 1200 or 1000 m²/g.

The activated carbon can comprise micro-, meso- and/or macroscale porosity. As defined herein, microscale pores have a pore size of 2 nm or less. Mesoscale pores have a pore size ranging from 2 to 50 nm. Macroscale pores have a pore size greater than 50 nm. In an embodiment, the activated carbon comprises a majority of microscale pores. The term "microporous carbon" and variants thereof means an activated carbon having a majority (i.e., at least 50%) of microscale pores. A microporous, activated carbon material can comprise greater than 50% microporosity (e.g., greater than 50, 55, 60, 65, 70, 75, 80, 85, 90 or 95% microporosity).

According to embodiments, a carbon-based electrode for an EDLC comprises activated carbon having a total porosity greater than about 0.4 cm³/g (e.g., greater than 0.4, 0.45, 0.5, 0.55, 0.6, 0.65 or 0.7 cm³/g). The portion of the total pore volume resulting from micropores ($d \leq 2$ nm) can be about 90% or greater (e.g., at least 90, 94, 94, 96, 98 or 99%) and the portion of the total pore volume resulting from ultramicropores ($d \leq 1$ nm) can be about 50% or greater (e.g., at least 50, 55, 60, 65, 70, 75, 80, 85, 90 or 95%).

The pore size distribution of the activated carbon can include ultramicropores, micropores, mesopores and macropores and may be characterized as having a unimodal, bimodal or multi-modal pore size distribution. The ultramicropores can comprise 0.2 cm³/g or more (e.g., 0.2, 0.25, 0.3, 0.35 or 0.4 cm³/g or more) of the total pore volume. Pores having a pore size (d) in the range of $1 < d \leq 2$ nm can comprise 0.05 cm³/g or more (e.g., at least 0.1, 0.15, 0.2 or 0.25 cm³/g) of the total pore volume. If present, any pores having a pore size greater than 2 nm, which may include mesopores and/or macropores, can comprise 0.15 cm³/g or less (e.g., less than 0.1 or 0.05 cm³/g) of the total pore volume. In an embodiment, the activated carbon material comprises pores having a size of $\leq 1$ nm, which provide a combined pore volume of >0.2 cm³/g, pores having a size from >1 nm to $\leq 2$ nm, which provide a combined pore volume of $\geq 0.05$ cm³/g, and <0.15 cm³/g combined pore volume of any pores having a size of >2 nm.

An electrochemical cell comprises a first carbon-based electrode and a second carbon-based electrode arranged within a casing, wherein each carbon-based electrode includes a current collector having opposing first and second major surfaces, a first conductive layer is formed over the first major surface, a second conductive layer is formed over the second major surface, and a first carbon-based layer and a second carbon-based layer each comprising activated carbon, carbon black and binder are formed over respective ones of the first and second conductive layers.

Figure 3:
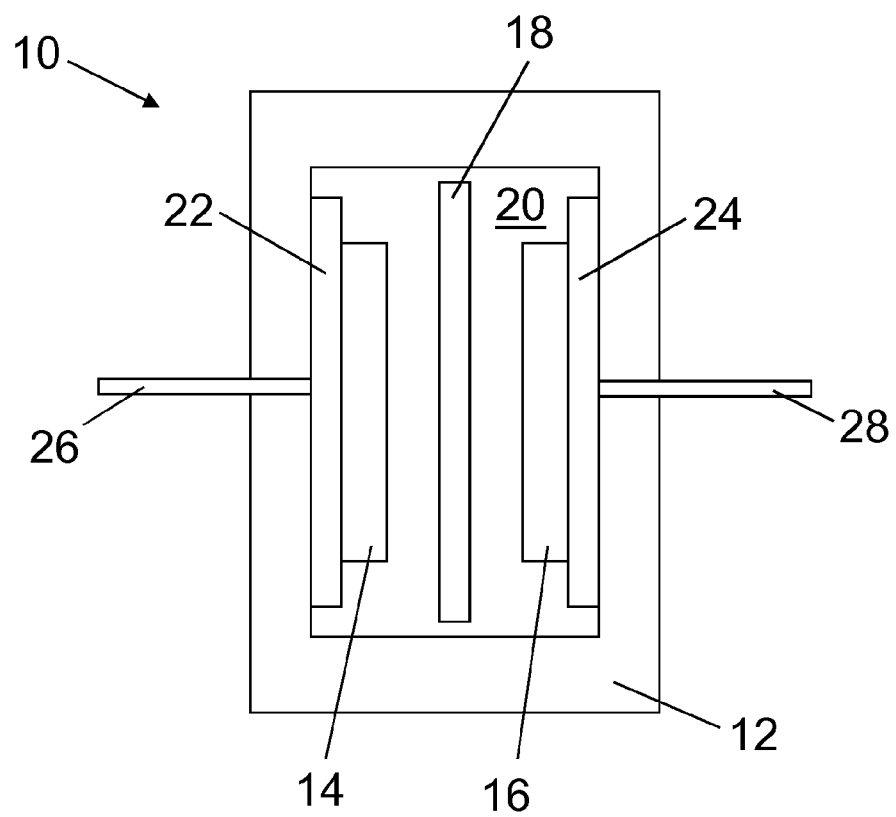
FIG. 3 is a schematic illustration of an example ultracapacitor.

FIG. 3 is a schematic illustration of an example ultracapacitor. Ultracapacitor 10 includes an enclosing body 12, a pair of current collectors 22, 24, a first carbon mat 14 and a second carbon mat 16 each respectively formed over one of the current collectors, and a porous separator layer 18. Electrical leads 26, 28 can be connected to respective current collectors 22, 24 to provide electrical contact to an external device. Layers 14, 16 may comprise activated carbon, carbon black and high molecular weight fluoropolymer binder. A liquid electrolyte 20 is contained within the enclosing body and incorporated throughout the porosity of both the porous separator layer and each of the porous electrodes. In embodiments, individual ultracapacitor cells can be stacked (e.g., in series) to increase the overall operating voltage.

The enclosing body 12 can be any known enclosure means commonly-used with ultracapacitors. The current collectors 22, 24 generally comprise an electrically-conductive material such as a metal, and commonly are made of aluminum due to its electrical conductivity and relative cost. For example, current collectors 22, 24 may be thin sheets of aluminum foil.

Porous separator 18 electronically insulates the electrodes from each other while allowing ion diffusion. The porous separator can be made of a dielectric material such as cellulosic materials, glass, and inorganic or organic polymers such as polypropylene, polyesters or polyolefins. In embodiments, a thickness of the separator layer can range from about 10 to 250 microns.

The electrolyte 20 serves as a promoter of ion conductivity, as a source of ions, and may serve as a binder for the carbon. The electrolyte typically comprises a salt dissolved in a suitable solvent. Suitable electrolyte salts include quaternary ammonium salts such as those disclosed in commonly-owned U.S. patent application Ser. No. 13/682,211, the disclosure of which is incorporated herein by reference. Example quaternary ammonium salts include tetraethylammonium tetraflouroborate (($Et)_4NBF_4$) or triethylmethyl ammonium tetraflouroborate ($Me(Et)_3NBF_4$).

Example solvents for the electrolyte include but are not limited to nitriles such as acetonitrile, acrylonitrile and propionitrile; sulfoxides such as dimethyl, diethyl, ethyl methyl and benzylmethyl sulfoxide; amides such as dimethyl formamide and pyrrolidones such as N-methylpyrrolidone. In embodiments, the electrolyte includes a polar aprotic organic solvent such as a cyclic ester, chain carbonate, cyclic carbonate, chain ether and/or cyclic ether solvent. Example cyclic esters and chain carbonates have from 3 to 8 carbon atoms, and in the case of the cyclic esters include β-butyro-lactone, γ-butyrolactone, γ-valerolactone and δ-valerolactone. Examples of the chain carbonates include dimethyl carbonate, diethyl carbonate, dipropyl carbonate, ethylene carbonate, methyl ethyl carbonate, methyl propyl carbonate and ethyl propyl carbonate. Cyclic carbonates can have from 5 to 8 carbon atoms, and examples include 1,2-butylene carbonate, 2,3-butylene carbonate, 1,2-pentene carbonate, 2,3-pentene carbonate and propylene carbonate. Chain ethers can have 4 to 8 carbon atoms. Example chain ethers include dimethoxyethane, diethoxyethane, methoxyethoxyethane, dibutoxyethane, dimethoxypropane, diethoxypropane and methoxyethoxypropnane. Cyclic ethers can have from 3 to 8 carbon atoms. Example cyclic ethers include tetrahydofuran, 2-methyl-tetrahydrofuran, 1,3-dioxolan, 1,2-dioxolan, 2-methyldioxolan and 4-methyldioxolan. A combination of two or more solvents may also be used.

Ultracapacitors may have a jelly roll design, prismatic design, honeycomb design, or other suitable configuration.

As examples, an assembled EDLC can comprise an organic liquid electrolyte such as tetraethylammonium tetrafluoroborate (TEA-TFB) or triethylmethylammonium tetrafluoroborate (TEMA-TFB) dissolved in an aprotic solvent such as acetonitrile.

It will be appreciated that with ionic salts such as tetraethylammonium tetrafluoroborate, the tetraethylammonium cation is larger than the tetraflouroborate anion. Without wishing to be bound by theory, the size of the $(Et)_4N^+$ cation is estimated be about 0.68 nm, while the size of the $BF_4^-$ anion is estimated to be about 0.48 nm.

Conventional approaches to the design of carbon-based electrodes typically involve maximizing the internal volume of the carbon material, which maximizes the achievable energy density. Specifically, these approaches lead to a predominance of smaller pores which yield a higher surface area per unit volume and thus a higher capacitance. Smaller pores, however, may inhibit the access and adsorption of larger ions. Further, aging-associated deposition of decomposition products from electrolyte may inhibit ion movement or cause ion trapping, which can yield to an undesired attenuation in the capacitance over time and/or cycling of the ultracapacitor.

Applicants have discovered that the pore size as well as the pore size distribution in the carbon-based electrodes can be optimized to account for the disparate ion sizes typically encountered in salt-based electrolytes. Specifically, Applicants have found that the loss of capacitance (e.g., due to ion trapping) can be minimized by tuning the activated carbon pore size and pore size distribution to the size of the ion that interacts with that particular carbon-based electrode.

In the disclosed configurations, the carbon-based electrode that interacts with the smaller anion is engineered to comprise a greater proportion of ultramicropores, while the carbon-based electrode that interacts with the cation is engineered to have a larger average pore size.

In example embodiments, a positive electrode includes a first activated carbon material comprising pores having a size of ≤1 nm, which provide a combined pore volume of >0.3 cm$^3$/g, pores having a size of >1 nm to ≤2 nm, which provide a combined pore volume of ≥0.05 cm$^3$/g, and <0.15 cm$^3$/g combined pore volume of any pores having a size of >2 nm. A negative electrode includes a second activated carbon material comprising pores having a size of ≤1 nm, which provide a combined pore volume of ≤0.3 cm$^3$/g, pores having a size of >1 nm to ≤2 nm, which provide a combined pore volume of ≥0.05 cm$^3$/g, and <0.15 cm$^3$/g combined pore volume of any pores having a size of >2 nm.

Activated carbon incorporated into the positive electrode may, for example, comprise pores having a size of ≤1 nm, which provide a combined pore volume of >0.3 to 0.5 cm$^3$/g. Such activated carbon may have pores having a size of >1 nm to ≤2 nm, which provide a combined pore volume of ≥0.2 cm$^3$/g (e.g., 0.2 to 0.3 cm$^3$/g), and <0.1 or <0.05 cm$^3$/g combined pore volume of any pores having a size of >2 nm.

Activated carbon incorporated into the negative electrode may, for example, comprise pores having a size of ≤1 nm, which provide a combined pore volume of 0.2 to 0.3 cm$^3$/g. Such activated carbon may have pores having a size of >1 nm to ≤2 nm, which provide a combined pore volume of ≥0.2 cm$^3$/g (e.g., 0.2 to 0.3 cm$^3$/g), and <0.1 or <0.05 cm$^3$/g combined pore volume of any pores having a size of >2 nm.

In an example EDLC, the activated carbon incorporated into the positive electrode may have a combined pore volume associated with pores having a size of >1 nm to ≤2 nm that is less than the corresponding combined pore volume of such size pores for the activated carbon incorporated into the negative electrode. In a further example EDLC, the activated carbon incorporated into the positive electrode may have a combined pore volume associated with any pores having a size of >2 nm that is less than the combined pore volume of pores of such sized pores for the activated carbon incorporated into the negative electrode.

The tuned carbon electrode assembly allows positive and negative ions to easily move in and out of the pores of the respective carbon electrodes, which minimizes capacitance fade while maintaining excellent performance.

Whether the activated carbon material has a pore size and a pore size distribution optimized for the positive or negative electrode, the presence of oxygen in the carbon, especially in the form of oxygen-containing surface functionalities, can adversely affect the properties of energy storage devices that comprise electrodes made from the activated carbon. For example, the presence of oxygen-containing surface functionalities can give rise to pseudocapacitance, increase the self-discharge or leakage rate, cause decomposition of the electrolyte, and/or cause a long term increase in resistance and deterioration of capacitance.

Oxygen functionalities can be introduced during the carbonization and activation steps, where the activating agent (e.g., steam or KOH) serves as an oxidation agent.

As a result of the potentially deleterious effects of incorporated oxygen, it can be advantageous to control and preferably minimize the oxygen content in activated carbon for use in energy storage devices such as EDLCs.

The total oxygen content of example activated carbon is at most 1.5 wt. %. By total oxygen content is meant the sum of all atomic and molecular oxygen in the carbon, including oxygen in oxygen-containing functional groups in and/or on the carbon.

In embodiments, activated carbon whether formed by physical or chemical activation, is subjected to a refining step wherein the activated carbon is heated in an inert or reducing environment to a temperature ranging from, for example, about 450-1000° C., e.g., 900° C., and for a period of, for example, about 0.5-10 hours. In various embodiments, a heat treatment temperature may range from 700-1000° C., 800-1000° C., 900-1000° C., 700-800° C., 700-900° C. or 800-900° C. Preferably, the environment during the refining step is substantially free of oxygen. The refining step reduces the oxygen content in the activated carbon. One method to reduce oxygen content is to refine (heat) the activated carbon in an inert environment (such as nitrogen, helium, argon, etc.) or in a reducing environment (such as hydrogen, forming gas, carbon monoxide, etc.). Example refining experiments were conducted in a retort furnace (CM Furnaces, Model 1212FL) purged with nitrogen.

In related embodiments, the total oxygen content of carbon black used to form carbon-based electrodes can be decreased in a parallel approach. For instance, prior to mixing activated carbon with carbon black and binder, the activated carbon and the carbon black can be refined. Refining of the activated carbon and the carbon black can be carried out separately, or in a unified process by mixing the activated carbon and the carbon black, and refining the mixture prior to combining the mixture with a binder.

The disclosure will be further clarified by the following examples.

EXAMPLES

Example 1

Wheat flour (8000 g) is placed in a graphite crucible and heated in a retort furnace (CM Furnaces model 1216FL). The furnace temperature is increased at a heating rate of 150° C./hr from room temperature to 800° C., maintained at 800° C. for 2 hrs, and then allowed to cool down naturally to 70° C. or less. During the foregoing heating/cooling cycle, the furnace is purged with $N_2$.

As a result of heating under flowing $N_2$, the wheat flour is carbonized and converted to a carbon material. The carbon can be ground to a powder using a hammer pound, pulverization and vibramilling. The ground carbon powder can have a particle size ($d_{50}$) of 10 micrometers or less (e.g., 1, 2, 5 or 10 micrometers).

The powdered carbon (550 grams) is mixed with 1210 grams of KOH powder. The carbon/KOH mixture is placed in SiC crucibles (Hexoloy® SA grade) and heated in a retort furnace. The furnace temperature is increased at a heating rate of 150° C./hr from room temperature to 750° C., maintained at 750° C. for 2 hours, and then allowed to cool down naturally to a temperature of about 100° C. During this heating/cooling cycle, the furnace is purged with $N_2$. By heating the carbon/KOH mixture, the KOH can be incorporated into the carbon material. The furnace is then allowed to cool down naturally to 70° C. or lower.

The resulting activated carbon can then be washed to remove excess potassium, potassium compounds, and other impurities. Washing can comprise rinsing the activated carbon with water or, according to an embodiment, alternately rinsing the activated carbon with water and a mixture of water and acid. One example washing sequence is disclosed below.

In one embodiment, the steam-activated carbon was used as received and designated as Sample AC-2a. In another embodiment, the steam-activated carbon was washed and filtered in dilute HCl and DI water until pH neutral, followed by heat treatment under 1% $H_2/N_2$ purge at 900° C. (similar to Sample AC-1b). The resulting carbon was designated as Sample AC-2b.

The activated carbon samples were characterized for total oxygen content using an elemental analyzer. The content of oxygen-containing surface functional groups was measured using Boehm titration. Results are summarized in Table 1 together with the oxygen content of the carbon black used to form the carbon-based electrodes.

TABLE 1

| | Oxygen and surface functional group content of activated carbon | | | | | | |
|---|---|---|---|---|---|---|---|
| Sample | $T_{reduction}$ [° C.] | Oxygen [wt. %] | Carboxylic+ Anhydride [mmol/g] | Lactone+ Lactol [mmol/g] | Hydroxyl [mmol/g] | BET [m²/g] | DFT pore volume [cm³/g] |
| AC-1a | 675 | 1.75 | 0.01 | 0.05 | 0.28 | 1926 | 0.66 |
| AC-1b | 900 | 0.76 | 0 | 0.01 | 0.19 | 2072 | 0.71 |
| AC-2a | n/a | 1.74 | 0 | 0.05 | 0.11 | 1708 | 0.60 |
| AC-2b | 900 | 0.50 | 0 | 0.03 | 0.06 | 1669 | 0.59 |
| AC-3 | 900 | n/a | n/a | n/a | n/a | n/a | n/a |
| AC-4a | n/a | n/a | n/a | n/a | n/a | n/a | n/a |
| AC-4b | 900 | n/a | n/a | n/a | n/a | n/a | n/a |
| CB | | 1.3 | 0.02 | 0.02 | 0.11 | | |

In a first washing step, the activated carbon is combined with 4000 mL of de-ionized water and the mixture is stirred and heated on a hot plate at a temperature of from about 90 to 100° C. for 30 minutes. Further rinsing of the solid material with water (e.g., 4000 mL de-ionized water at ~20-25° C.) can be repeated one, two or three additional times. Solid material (i.e., carbon) can be separated from the liquid by vacuum-assisted filtration.

In a second washing step, the previously-obtained carbon material is combined first with 3000 mL of de-ionized water and then 1000 mL of 37% aqueous HCl. The mixture is stirred at ~20-25° C. for 60 minutes, after which the solid material is separated from the liquid by vacuum-assisted filtration. The solid material is repeatedly washed with deionized water and filtered until the effluent is pH neutral.

In order to remove surface functional groups and decrease the oxygen content in the activated carbon, the activated carbon was treated with an additional heat treatment, which involves heating the activated carbon in an inert or reducing atmosphere to a temperature in a range of 600-1000° C.

The activated carbon is placed in quartz crucibles and loaded into a furnace (CM Furnaces model 1216FL). In one example, the furnace temperature is increased at a heating rate of 150° C./hr to a temperature of about 675° C., maintained at temperature for 2 hours, and then allowed to cool down naturally (Sample AC-1a). In a second embodiment, the furnace temperature is increased at a heating rate of 150° C./hr to a temperature of about 900° C. (Sample AC-1b). During the foregoing heating/cooling cycle, the furnace is constantly purged, e.g., with $N_2$ or a $H_2/N_2$ mixture.

Example 2

A commercially-available steam-activated carbon derived from coconut shells was used to prepare a second activated carbon material.

Referring to Table 1, Samples AC-1b and AC-2b have lower total oxygen content than Samples AC-1a and AC-2a, which is attributable to the high temperature (900° C.) reduction step. Samples AC-1b and AC-2b are also free of carboxylic and carboxylic anhydride groups and have significantly lower amounts of lactone, lactol groups and hydroxyl groups compared to Samples AC-1a and AC-2a, respectively.

Note that the three types of functional groups are electrochemically reactive with decreasing reactivity from left to right as shown in Table 1.

Figure 2:
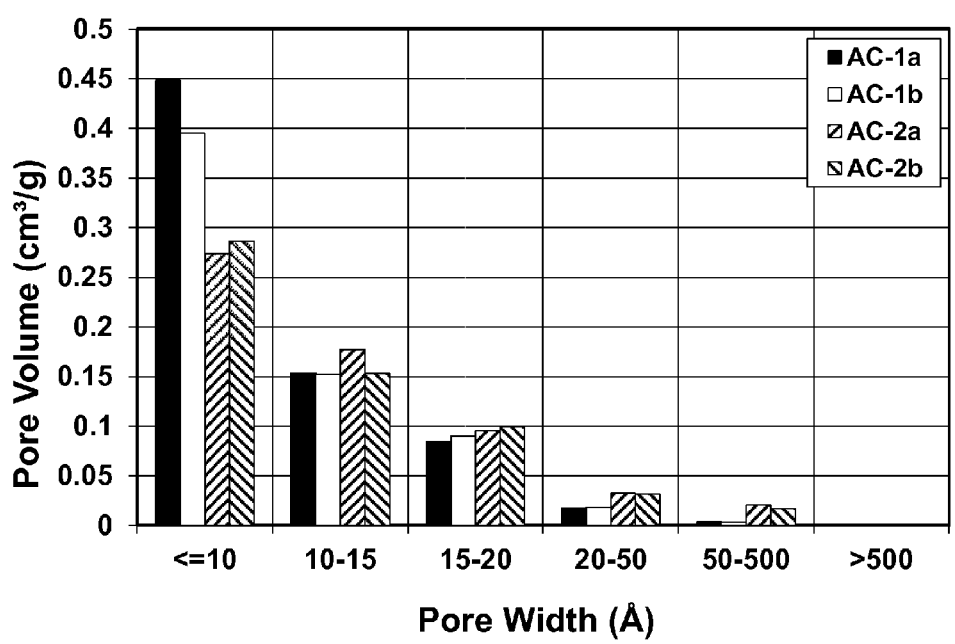
FIG. 2 is a histogram showing the pore size distribution of activated carbon materials suitable for incorporation into positive or negative electrodes of an energy storage device according to various embodiments.

Pore size data are determined using $N_2$ adsorption on a Micromeritics ASAP 2420 and calculated using the Density Functional Theory (DFT) assuming slit pores. The total pore volume for each of the samples is summarized in Table 1. Histograms of the respective pore size distributions are shown in FIG. 2.

Electrical properties of the carbon can be obtained by incorporating the activated carbon into carbon-based electrodes, which are in turn incorporated into an ultracapacitor. To form the carbon-based electrodes, the activated carbon is first combined with conductive carbon (e.g., Black Pearls®, which is marketed by Cabot Corporation, Boston, Mass. Black Pearl 2000) and Teflon® (PTFE). The carbon black serves as a conductive additive and the PTFE serves as a binder. The activated carbon, carbon black and PTFE are blended in the proportion of 85:5:10 by weight and rolled into thin sheets, which are laminated onto aluminum current collectors. A pair of carbon-based electrodes are rolled into jelly roll using a pair of intervening cellulosic separator, which are then placed into an aluminum can to form an ultracapacitor for testing. A solution of 1.2 M triethylmethylammonium tetrafluoroborate (TEMA-TFB) in acetonitrile is used as the electrolyte.

The 3V performance of two different cells each having a different configuration of carbon-based electrodes is summarized in Table 2.

A first test cell (T-1) includes a positive electrode comprising Sample AC-1a activated carbon and a negative electrode comprising Sample AC-2a carbon. A second test cell (T-2) includes a positive electrode comprising Sample AC-1b activated carbon and a negative electrode comprising Sample AC-2b carbon.

Referring to Table 2, it can be seen that although the second test cell has a slightly lower initial capacitance than the first test cell, the second cell exhibits a lower ESR, and lower self discharge (i.e., higher retained voltage after self-discharge).

The improved 3V stability of T-2 with respect to T-1 is attributable to the difference in oxygen content and surface functional group compositions of the activated carbon pairs in the two cells. High voltage stability, high capacitance cells are characterized by a tailored pore size distribution and low total oxygen content, including a decreased content of surface oxygen-containing functional groups.

The content of various elemental impurities in Samples AC-1a, AC-1b, AC-2a and AC-2b was measured by inductively coupled plasma mass spectrometry (ICP-MS). The results are tabulated in Table 4a.

TABLE 4a

Carbon impurity data
Concentration μg/g (ppm)

|       | Ag | Al   | As | Au | B    | Ba | Be | Bi | Ca  | Cd | Ce | Co | Cr |
|-------|----|------|----|----|------|----|----|----|-----|----|----|----|----|
| AC-1a | <1 | <1   | <1 | <1 | <10  | <1 | <1 | <1 | <30 | <1 | <1 | <1 | <1 |
| AC-1b | <1 | <1   | <1 | <1 | <10  | <1 | <1 | <1 | <30 | <1 | <1 | <1 | <1 |
| AC-2a | <1 | 1700 | <1 | <1 | <10  | <1 | <1 | <1 | <30 | <1 | <1 | <1 | <1 |
| AC-2b | <1 | 1700 | <1 | <1 | <10  | <1 | <1 | <1 | <30 | <1 | <1 | <1 | <1 |

|       | Cs | Cu | Dy | Er | Eu | Fe | Ga | Gd | Ge | Hf | Ho | Ir | K   |
|-------|----|----|----|----|----|----|----|----|----|----|----|----|-----|
| AC-1a | <1 | <1 | <1 | <1 | <1 | 8  | <1 | <1 | <1 | <1 | <1 | <1 | 160 |
| AC-1b | <1 | <1 | <1 | <1 | <1 | 7  | <1 | <1 | <1 | <1 | <1 | <1 | 6   |
| AC-2a | <1 | 28 | <1 | <1 | <1 | 16 | <1 | <1 | <1 | <1 | <1 | <1 | 41  |
| AC-2b | <1 | 13 | <1 | <1 | <1 | 13 | <1 | <1 | <1 | <1 | <1 | <1 | 5   |

|       | La | Li | Lu | Mg | Mn | Mo | Na | Nb | Nd | Ni | P    | Pb | Pd |
|-------|----|----|----|----|----|----|----|----|----|----|------|----|----|
| AC-1a | <1 | <1 | <1 | <5 | <1 | <1 | 2  | <1 | <1 | 3  | <100 | <1 | <1 |
| AC-1b | <1 | <1 | <1 | <5 | <1 | <1 | <1 | <1 | <1 | 1  | <100 | <1 | <1 |
| AC-2a | <1 | <1 | <1 | 21 | <1 | <1 | 14 | <1 | <1 | <1 | <100 | <1 | <1 |
| AC-2b | <1 | <1 | <1 | 13 | <1 | <1 | 5  | <1 | <1 | 1  | <100 | <1 | <1 |

|       | Pr | Pt | Rb | Re | Rh | Ru | Sb | Sc | Se | Si   | Sm | Sn | Sr |
|-------|----|----|----|----|----|----|----|----|----|------|----|----|----|
| AC-1a | <1 | <5 | <1 | <1 | <1 | <1 | <1 | <1 | <1 | <100 | <1 | <1 | <1 |
| AC-1b | <1 | <5 | <1 | <1 | <1 | <1 | <1 | <1 | <1 | <100 | <1 | <1 | <1 |
| AC-2a | <1 | <5 | <1 | <1 | <1 | <1 | <1 | <1 | <1 | 540  | <1 | <1 | <1 |
| AC-2b | <1 | <5 | <1 | <1 | <1 | <1 | <1 | <1 | <1 | 540  | <1 | <1 | <1 |

|       | Ta | Tb | Te | Th | Ti  | Tl | Tm | V  | W  | Y  | Yb | Zn | Zr |
|-------|----|----|----|----|-----|----|----|----|----|----|----|----|----|
| AC-1a | <1 | <1 | <1 | <1 | <25 | <1 | <1 | <1 | <1 | <1 | <1 | <1 | 39 |
| AC-1b | <1 | <1 | <1 | <1 | <25 | <1 | <1 | <1 | <1 | <1 | <1 | <1 | 22 |
| AC-2a | <1 | <1 | <1 | <1 | <25 | <1 | <1 | <1 | <1 | <1 | <1 | <1 | 8  |
| AC-2b | <1 | <1 | <1 | <1 | <25 | <1 | <1 | <1 | <1 | <1 | <1 | <1 | 10 |

TABLE 2

Test cell configurations and beginning-of-life (BOL) performance

| Test Cell | Electrode configuration | $C_{init}$ [F] | ESR [mOhm] | V @ 20 hrs. |
|-----------|-------------------------|----------------|------------|-------------|
| T-1       | AC-1a(+)/AC-2a(−)       | 2950           | 0.46       | 2.59        |
| T-2       | AC-1b(+)/AC-2b(−)       | 2875           | 0.39       | 2.64        |
| T-3       | AC-3(+)/AC-4a(−)        | 2857           | 0.36       | 2.66        |
| T4        | AC-3(+)/AC-4b(−)        | 2826           | 0.38       | 2.67        |

Figure 4:
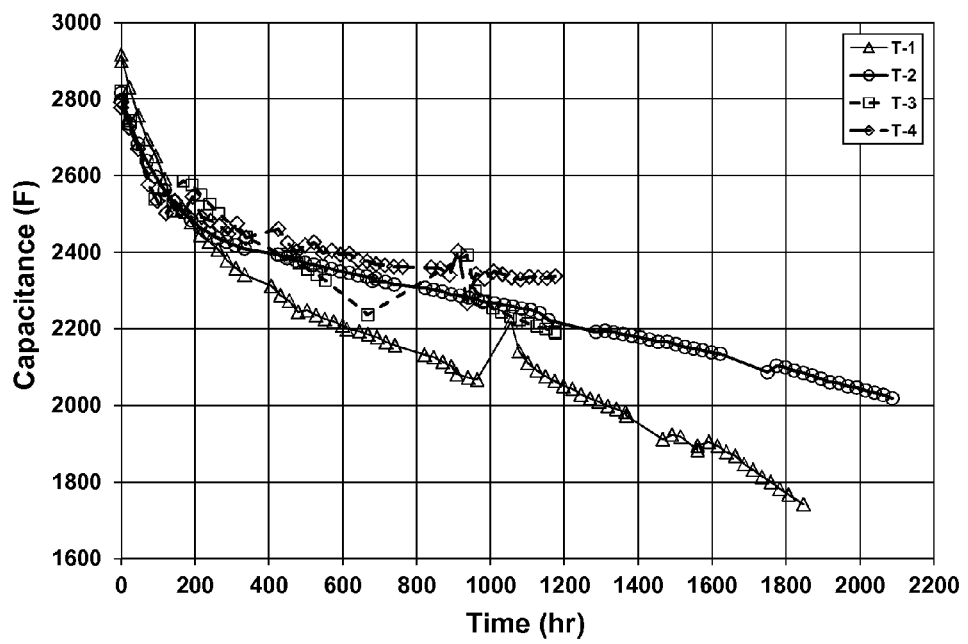
FIG. 4 is a plot of capacitance versus time for example test cells.
Figure 5:
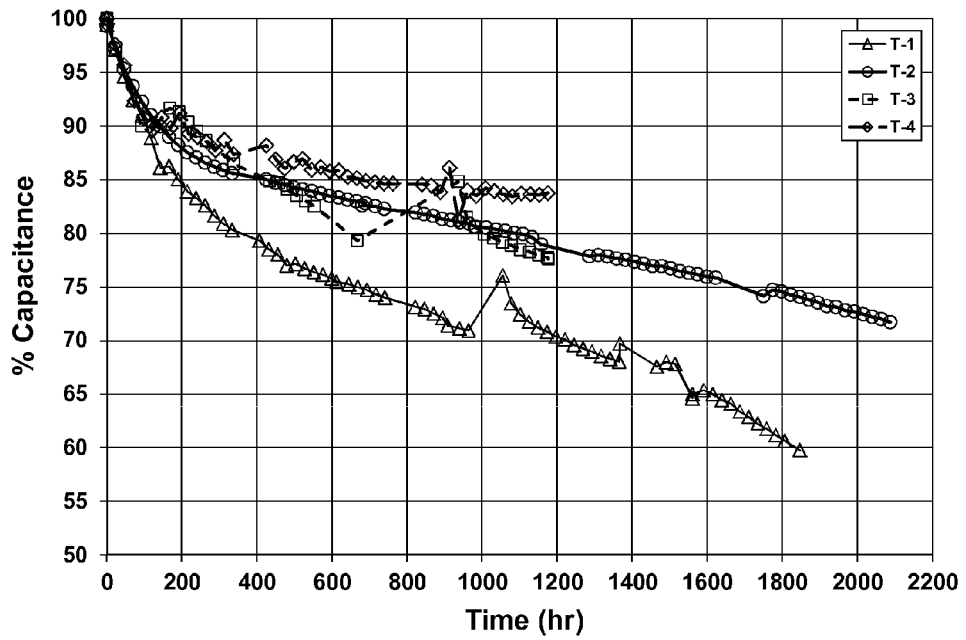
FIG. 5 is a normalized plot of capacitance versus time for the data of FIG. 4.

The test cells were stress tested at 3V and 65° C. As shown in FIG. 4, capacitance decay of T-2 was significantly slower than that of T-1. The difference in normalized capacitance as shown in FIG. 5 (i.e., the capacitance at any time divided by the capacitance at time 0) was even more pronounced. An 80% degradation in T-1 was observed in less than 350 hours while T-2 maintained a normalized capacitance of at least 80% through 1000 hours.

TABLE 4b

Carbon impurity data
Concentration μg/g (ppm)

|       | Ag | Al | As | Au | B  | Ba | Be | Bi | Ca | Cd |
|-------|----|----|----|----|----|----|----|----|----|----|
| AC-3  | <1 | 13 | <1 | <1 | <5 | <1 | <1 | <1 | <5 | <1 |
| AC-4a | <1 | 42 | <1 | <1 | <5 | <1 | <1 | <1 | 16 | <1 |
| AC-4b | <1 | 43 | <1 | <1 | <5 | <1 | <1 | <1 | 16 | <1 |

|       | Ce | Co | Cr | Cs | Cu | Dy | Er | Eu | Fe | Ga |
|-------|----|----|----|----|----|----|----|----|----|----|
| AC-3  | <1 | <1 | 2  | <1 | <1 | <1 | <1 | <1 | 7  | <1 |
| AC-4a | <1 | <1 | 1  | <1 | 23 | <1 | <1 | <1 | 12 | <1 |
| AC-4b | <1 | <1 | 2  | <1 | 24 | <1 | <1 | <1 | 17 | <1 |

|       | Gd | Ge | Hf | Ho | In | Ir | K   | La | Li | Lu |
|-------|----|----|----|----|----|----|-----|----|----|----|
| AC-3  | <1 | <1 | <1 | <1 | IS | <1 | 200 | <1 | <1 | <1 |
| AC-4a | <1 | <1 | <1 | <1 | IS | <1 | 34  | <1 | <1 | <1 |
| AC-4b | <1 | <1 | <1 | <1 | IS | <1 | 35  | <1 | <1 | <1 |

TABLE 4b-continued

Carbon impurity data
Concentration µg/g (ppm)

| | Mg | Mn | Mo | Na | Nb | Nd | Ni | P | Pb | Pd |
|---|---|---|---|---|---|---|---|---|---|---|
| AC-3 | <5 | <1 | <1 | 2 | <1 | <1 | 2 | <100 | <1 | <1 |
| AC-4a | 5 | <1 | <1 | 6 | <1 | <1 | <1 | <100 | <1 | <1 |
| AC-4b | 5 | <1 | <1 | 6 | <1 | <1 | 1 | <100 | <1 | <1 |

| | Pr | Pt | Rb | Re | Rh | Ru | Sb | Sc | Se | Sm |
|---|---|---|---|---|---|---|---|---|---|---|
| AC-3 | <1 | <1 | <1 | <1 | <1 | <1 | <1 | <1 | <1 | <1 |
| AC-4a | <1 | <1 | <1 | <1 | <1 | <1 | <1 | <1 | <1 | <1 |
| AC-4b | <1 | <1 | <1 | <1 | <1 | <1 | <1 | <1 | <1 | <1 |

| | Sn | Sr | Ta | Tb | Te | Th | Ti | Tl | Tm | U |
|---|---|---|---|---|---|---|---|---|---|---|
| AC-3 | <1 | <1 | <1 | <1 | <1 | <1 | 65 | <1 | <1 | <1 |
| AC-4a | <1 | <1 | <1 | <1 | <1 | <1 | 61 | <1 | <1 | <1 |
| AC-4b | <1 | <1 | <1 | <1 | <1 | <1 | 73 | <1 | <1 | <1 |

| | V | W | Y | Yb | Zn | Zr |
|---|---|---|---|---|---|---|
| AC-3 | <1 | <1 | <1 | <1 | 1 | 35 |
| AC-4a | <1 | 1 | <1 | <1 | <1 | <1 |
| AC-4b | <1 | 1 | <1 | <1 | <1 | <1 |

Example 3

The total oxygen content of commercially-available carbon black (Black Pearls®, Cabot Corporation, Boston, Mass.) was reduced from 1.3 wt. % to about 0.4 wt. % by a reefing step that included heating the carbon black at 675° C. in a forming gas ambient (1% $H_2$ in $N_2$).

Example 4

Sample AC-3 is made using the same process as used for Sample AC-1a, except that the final heat treatment is carried out at 900° C. instead of 675° C. in a 1% $H_2/N_2$ mixture. Without wishing to be bound by theory, because the heat treatment temperature is believed to play an important role in the surface functionalization, the total oxygen content and oxygen-containing functional groups, surface area, pore volume, and pore size distribution for AC-3 are expected to be similar to those of AC-1b. Impurity concentrations for AC-3 are shown in Table 4b.

Example 5

Sample AC-4a is the same as sample AC-2a. Sample AC-4b is obtained by heat treating a portion of Sample AC-4a at 900° C. in 1% $H_2/N_2$ without washing. The total oxygen content and oxygen-containing functional groups, surface area, pore volume, and pore size distributions for AC-4a and AC-4b are expected to be similar to those of AC-1a and AC-1b, respectively. Impurity concentrations of AC-4a and AC-4b are shown in Table 4b.

A third test cell (T-3) includes a positive electrode comprising Sample AC-3 activated carbon and a negative electrode comprising Sample AC-4a activated carbon. A fourth test cell (T-4) includes a positive electrode comprising Sample AC-3 activated carbon and a negative electrode comprising Sample AC-4b carbon.

Referring to Table 2, it can be seen that the T-3 and T-4 test cells show lower ESR and lower self-discharge (i.e., higher retained voltage after self-discharge) than T-1, and are comparable to those of T-2.

The test cells T-3 and T-4 were stress tested at 3V and 65° C. As shown in FIGS. 4 and 5, capacitance decay of T-3 and T-4 was significantly slower than that of T-1 both on an absolute and normalized capacitance basis.

As used herein, the singular forms "a," "an" and "the" include plural referents unless the context clearly dictates otherwise. Thus, for example, reference to an "oxygen-containing functional group" includes examples having two or more such "functional groups" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It is also noted that recitations herein refer to a component being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a carbon-based electrode that comprises activated carbon, carbon black and binder include embodiments where a carbon-based electrode consists of activated carbon, carbon black and binder and embodiments where a carbon-based electrode consists essentially of activated carbon, carbon black and binder.

It will be apparent to those skilled in the art that various modifications and variations can be made to the present invention without departing from the spirit and scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

We claim:

1. An energy storage device comprising:
   a positive electrode comprising a first activated carbon material and a negative electrode comprising a second activated carbon material, wherein the first activated carbon material comprises pores having a size of ≤1 nm, which provide a combined pore volume of >0.3 cm$^3$/g;
pores having a size from >1 nm to ≤2 nm, which provide a combined pore volume of ≥0.05 cm$^3$/g; and
<0.15 cm$^3$/g combined pore volume of any pores having a size of >2 nm;
the second activated carbon material comprises pores having a size of ≤1 nm, which provide a combined pore volume of less than 0.3 cm$^3$/g;
pores having a size from >1 nm to ≤2 nm, which provide a combined pore volume of ≥0.05 cm$^3$/g; and
<0.15 cm$^3$/g combined pore volume of any pores having a size of >2 nm; and
the first activated carbon material has a total oxygen content of at most 1.5 wt. %.

2. The energy storage device according to claim 1, wherein the first activated carbon material comprises pores having a size of ≤1 nm, which provide a combined pore volume of >0.3 to 0.5 cm$^3$/g, and the second activated carbon material comprises pores having a size of ≤1 nm, which provide a combined pore volume of 0.2 to less than 0.3 cm$^3$/g.

3. The energy storage device according to claim 1, wherein the first activated carbon material comprises pores having a size of >1 nm to ≤2 nm, which provide a combined pore volume of ≥0.2 cm$^3$/g; and the second activated carbon material comprises pores having a size of >1 nm to ≤2 nm, which provide a combined pore volume of ≥0.2 cm$^3$/g.

4. The energy storage device according to claim 3, wherein the combined pore volume of the pores having a size of >1 nm to ≤2 nm in the first activated carbon material is less than the combined pore volume of the pores having a size of >1 nm to ≤2 nm in the second activated carbon material.

5. The energy storage device according to claim 1, wherein the first activated carbon material comprises pores having a size of >2 nm, which provide a combined pore volume of <0.15 cm$^3$/g; and the second activated carbon material comprises pores having a size of >2 nm, which provide a combined pore volume of <0.15 cm$^3$/g.

6. The energy storage device according to claim 5, wherein the combined pore volume of the pores having a size of >2 nm in the first activated carbon material is less than the combined pore volume of the pores having a size of >2 nm in the second activated carbon material.

7. The energy storage device according to claim 1, wherein the second activated carbon material has a total oxygen content of at most 1.5 wt. %.

8. The energy storage device according to claim 1, wherein the positive electrode comprises a mixture of the first activated carbon material, conductive carbon and binder, and the negative electrode comprises a mixture of the second activated carbon material, conductive carbon and binder.

9. The energy storage device according to claim 8, wherein the conductive carbon in the positive electrode has a total oxygen content of at most 1.5 wt. %.

10. The energy storage device according to claim 8, wherein the conductive carbon in each of the positive electrode and the negative electrode has a total oxygen content of at most 1.5 wt. %.

11. The energy storage device according to claim 1, wherein a thickness of the negative electrode is different from a thickness of the positive electrode.

12. The energy storage device according to claim 1, wherein a total pore volume of the first activated carbon material is greater than 0.5 cm$^3$/g and a total pore volume of the second activated carbon material is greater than 0.5 cm$^3$/g.

13. The energy storage device according to claim 1, wherein a total pore volume of the first activated carbon material is greater than 0.6 cm$^3$/g.

14. The energy storage device according to claim 1, wherein each of the first activated carbon material and the second activated carbon material have a total oxygen content of less than 1 wt. %.

15. The energy storage device according to claim 1, wherein each of the first activated carbon material and the second activated carbon material includes less than 0.5 mmol/g of oxygen-containing surface functional groups.

16. The energy storage device according to claim 1, wherein the device is an ultracapacitor.

17. The energy storage device according to claim 16, wherein the ultracapacitor has a design selected from the group consisting of a jelly roll design, a prismatic design, and a honeycomb design.

18. The energy storage device according to claim 1, wherein the positive electrode and the negative electrode each further comprise carbon black having a total oxygen content of at most 1.5 wt. %.

19. The energy storage device according to claim 1, further comprising an electrolyte solution of triethylmethylammonium tetrafluoroborate dissolved in an aprotic solvent.

20. An energy storage device comprising:
a positive electrode comprising a first activated carbon material and a negative electrode comprising a second activated carbon material, wherein
the first activated carbon material comprises pores having a size of ≤1 nm, which provide a combined pore volume of >0.3 cm$^3$/g;
the second activated carbon material comprises pores having a size of ≤1 nm, which provide a combined pore volume of less than 0.3 cm$^3$/g; and
at least the first activated carbon material has a total oxygen content of less than 1.5 wt. %.

21. The energy storage device according to claim 20, further comprising an electrolyte solution of triethylmethylammonium tetrafluoroborate dissolved in an aprotic solvent.

22. A method of making an energy storage device comprising:
forming a positive carbon-based electrode having a first activated carbon material;
forming a negative carbon-based electrode having a second activated carbon material; and
incorporating the positive and negative carbon-based electrodes into an energy storage device, wherein
the first activated carbon material comprises pores having a size of ≤1 nm, which provide a combined pore volume of >0.3 cm$^3$/g;
pores having a size from >1 nm to ≤2 nm, which provide a combined pore volume of ≥0.05 cm$^3$/g; and
<0.15 cm$^3$/g combined pore volume of any pores having a size of >2 nm;
the second activated carbon material comprises pores having a size of ≤1 nm, which provide a combined pore volume of less than 0.3 cm$^3$/g;
pores having a size from >1 nm to ≤2 nm, which provide a combined pore volume of ≥0.05 cm$^3$/g; and
<0.15 cm$^3$/g combined pore volume of any pores having a size of >2 nm; and at least the first activated carbon material has a total oxygen content of at most 1.5 wt. %.

23. The method according to claim 22, wherein at least one of the first activated carbon material and the second activated carbon material are heated in an inert or reducing atmosphere prior to forming the positive and negative electrodes.

24. The method according to claim 22, wherein the positive and negative carbon-based electrodes comprise carbon black and further comprising heating the carbon black in an inert or reducing atmosphere prior to forming the positive and negative electrodes.

* * * * *